Jan. 30, 1940.  W. A. SWAN  2,188,763
VEHICLE ROCKING DEVICE
Filed Sept. 4, 1937  5 Sheets-Sheet 1
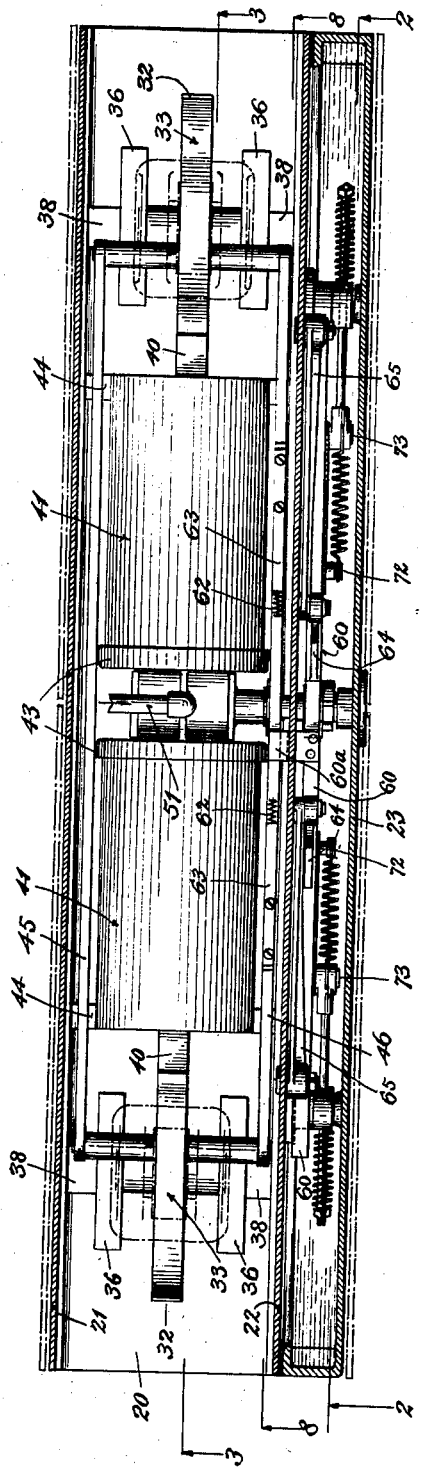
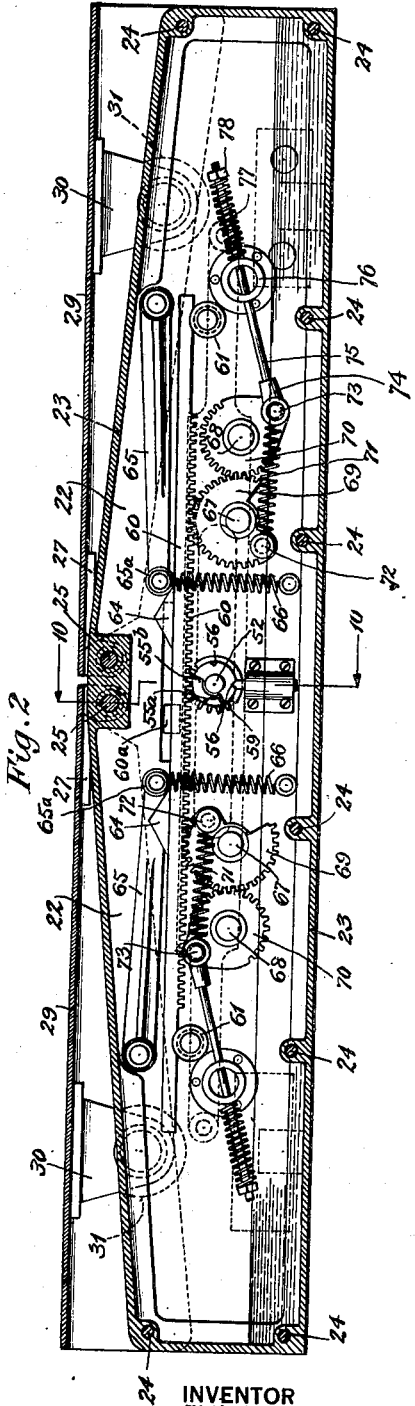
INVENTOR
*Willis A. Swan,*
BY
ATTORNEY Jan. 30, 1940.  W. A. SWAN  2,188,763
VEHICLE ROCKING DEVICE
Filed Sept. 4, 1937  5 Sheets-Sheet 2
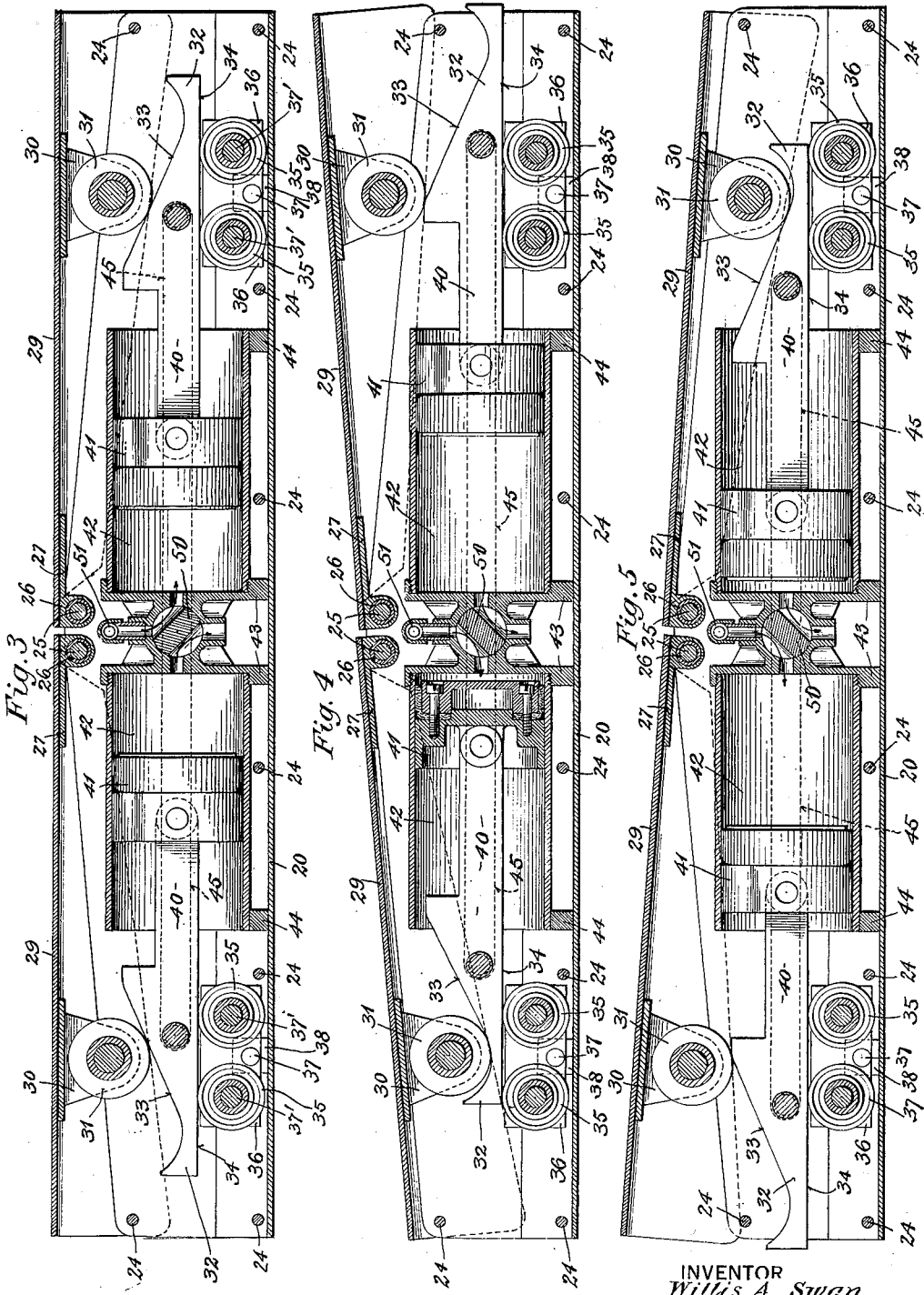

Jan. 30, 1940.  W. A. SWAN  2,188,763
VEHICLE ROCKING DEVICE
Filed Sept. 4, 1937   5 Sheets-Sheet 3
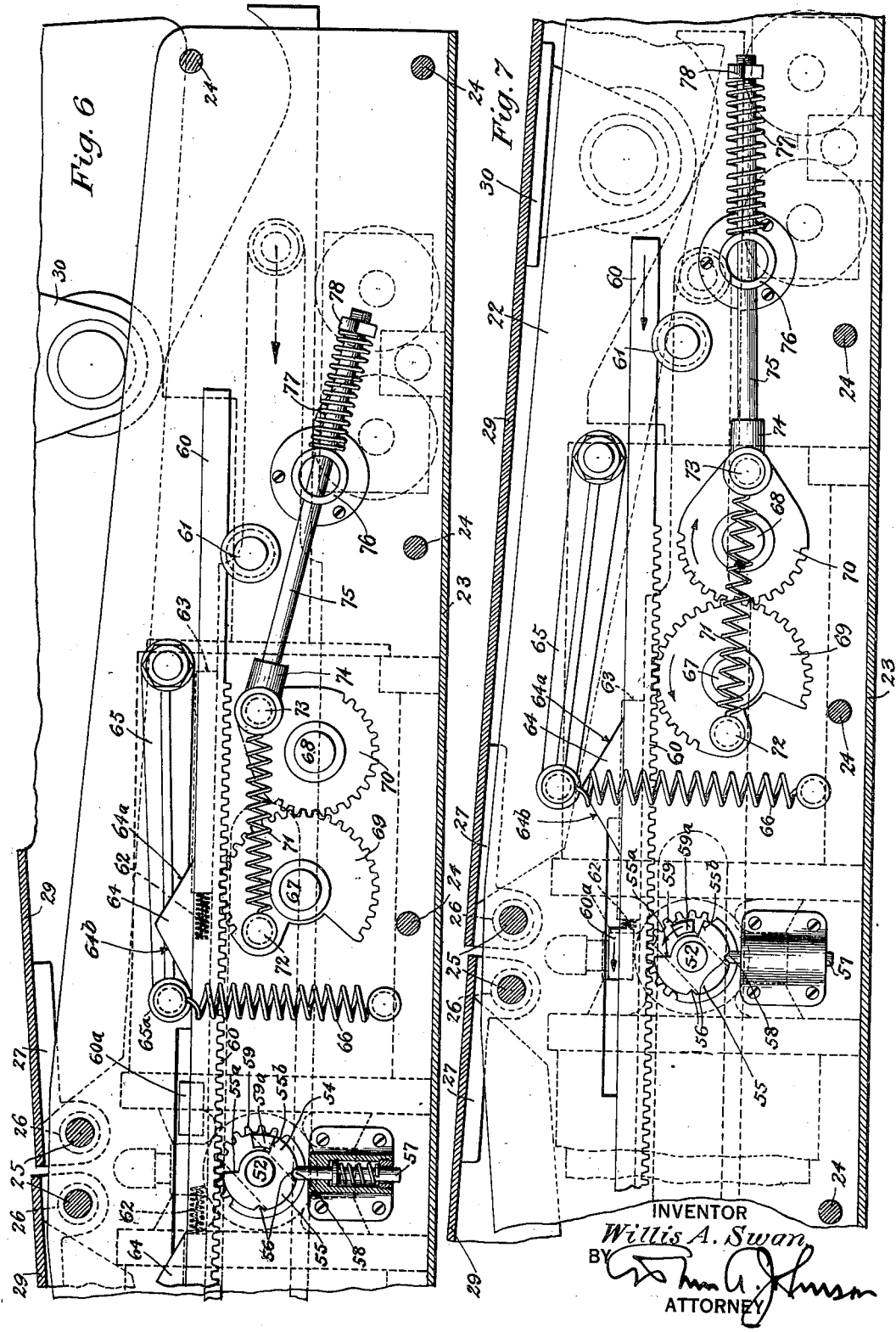
INVENTOR
*Willis A. Swan*
BY 
ATTORNEY Jan. 30, 1940. W. A. SWAN 2,188,763
VEHICLE ROCKING DEVICE
Filed Sept. 4, 1937 5 Sheets-Sheet 4
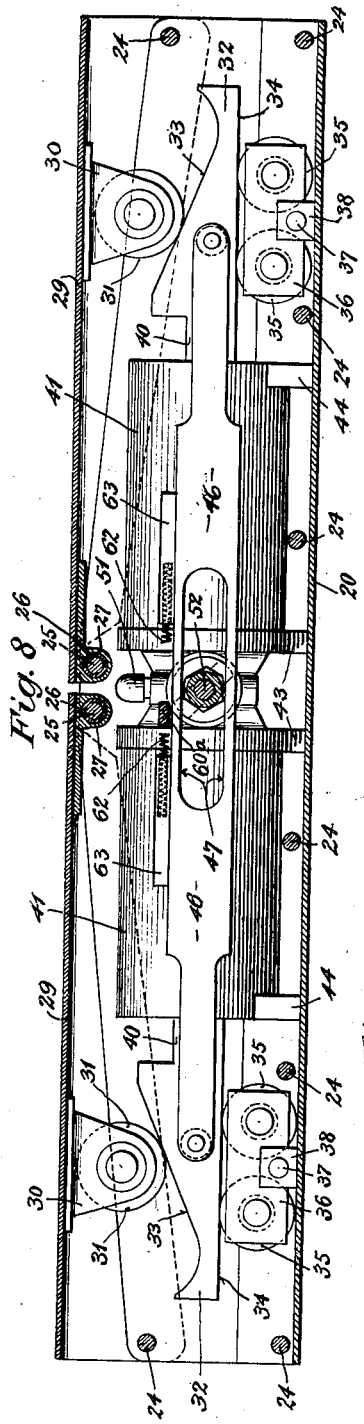
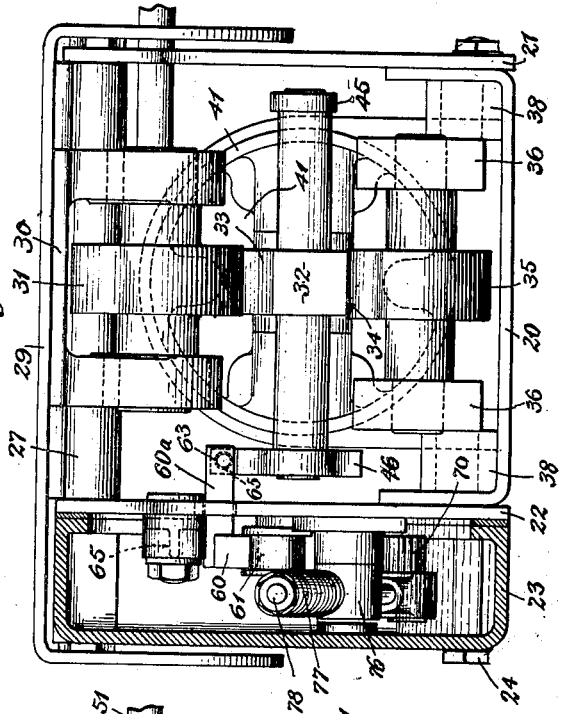
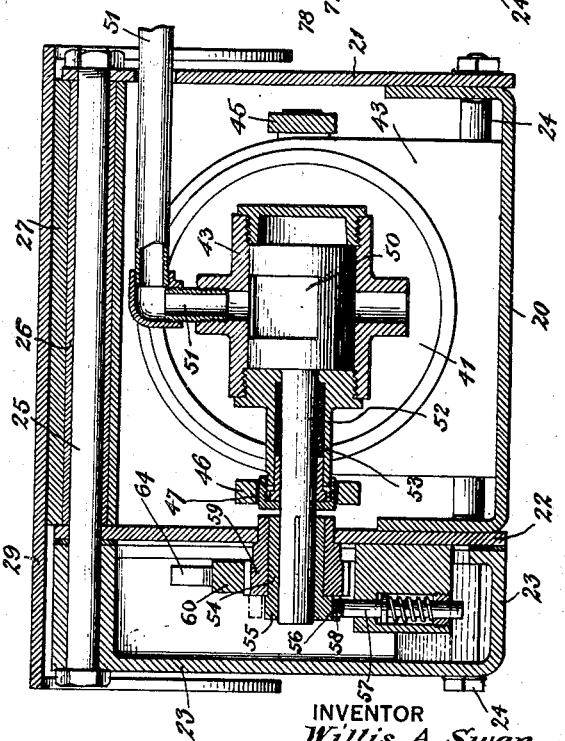
INVENTOR
Willis A. Swan,
BY
ATTORNEY Jan. 30, 1940.  W. A. SWAN  2,188,763
VEHICLE ROCKING DEVICE
Filed Sept. 4, 1937  5 Sheets—Sheet 5
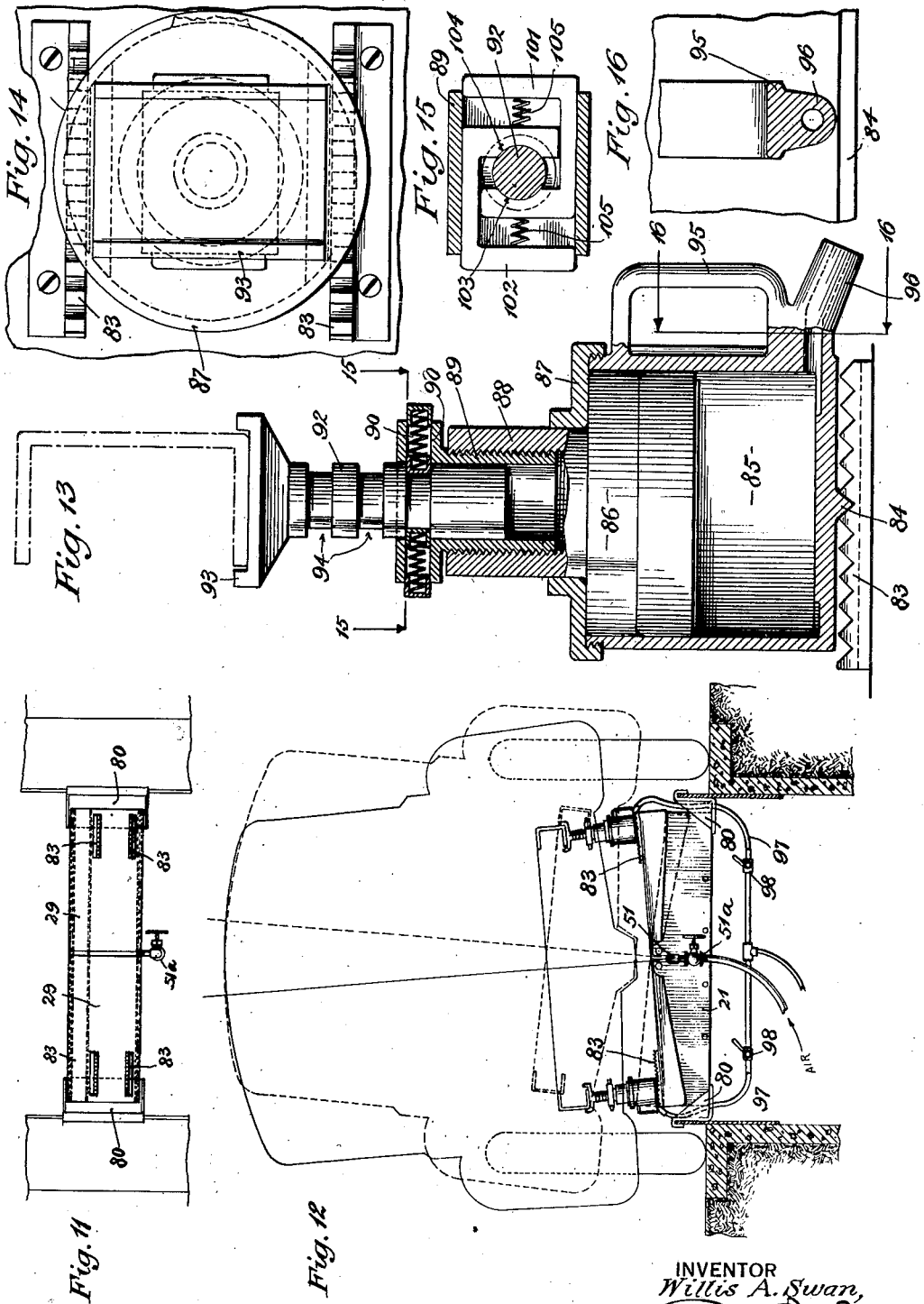

Patented Jan. 30, 1940

2,188,763

UNITED STATES PATENT OFFICE 2,188,763

VEHICLE ROCKING DEVICE

Willis A. Swan, Bridgeport, Conn., assignor to Arthur A. Johnson, Bridgeport, Conn.

Application September 4, 1937, Serial No. 162,463

12 Claims. (Cl. 73—51)

This invention relates to an improved vehicle rocking mechanism and more particularly that type of mechanism adapted to be used with an automotive vehicle while the latter is being serviced.

According to the usual custom of servicing automobiles and like vehicles at service stations, the car is run on the service rack into such position that an attendant may have access to the parts to be inspected, repaired, tightened or lubricated. In many instances, for example, it is necessary to detect squeaks in the body which require tightening or lubrication. To detect these squeaks another attendant is usually required to shake or rock the machine to simulate road travel until the squeak occurs and is tracked down. Another difficulty encountered in servicing cars resides in "frozen" joints such as those of the shackle bolts which require manipulation before the grease can be forced through them. This usually requires a second attendant to apply a bar or other tool to the shackle and rock the shackle while the grease is being injected. These operations, which require the use of a second attendant at the servicing pit or rack, add to the expense as applied to the particular job.

Accordingly, the present invention provides a device which will engage the chassis or the body of the machine and rock the same from side to side. This will cause any loose connections to squeak or rattle and will also cause the joints where greasing is to be desired, for example in the springs and in the shackle bolts, to be loosened so that they may be properly lubricated. In using the device of the present invention only a single operator is required, and he can detect the squeaks or loose connections and apply the lubrication while the car is automatically rocked by the device.

The device of the present invention also can be used for the purpose of jacking up wheels for tire repairs, brake adjustment and the like, and also for other repairs which may require lifting of the car body.

According to the present invention, the device consists of a pair of plates centrally pivoted on a frame mounted on the rack or pit and extending transversely of the automobile. These transversely-extending plates are provided with means to engage the chassis or the body of the automobile to support the same. Mounted on the frame in cooperative relation with each of the pivoted elements is a cam or wedge-like element mounted for horizontal sliding movement of the frame. A piston and cylinder is connected to each of the cam-like members to reciprocate the latter in a horizontal direction to cause the pivoted plate to move upwardly and downwardly and thus move the body of the automobile with a rocking movement. A snap-action mechanism is incorporated in the device to throw a valve so that it alternately vents and charges the adjacent cylinders to cause the rocking action to take place.

According to the present invention, the cylinders and pistons for actuating the cams are placed horizontally in alignment with the cams, so that the direct load carried by the pivoted plate is not applied directly to the cylinder and piston but to the cam. Also, because of the relation and design of the parts, low-pressure air may be used to supply the motive means for the cams.

Because of the great differences in clearance between the chassis or bodies of the cars and the ground in the various cars now being produced, great difficulty has been encountered in providing an adequate supporting element for the device which would accommodate all of the various cars with the minimum effort.

Accordingly the present invention provides an adjustable jack mounted on the pivotal element for movement into operative relation with the chassis or body of the vehicle. This jack is provided with means on its base whereby it may be adjusted along the transversely-extending element to accommodate cars of various widths, and has mounted on the base a lifting mechanism having a tubular upwardly-extending stem into which is positioned an adjustable sleeve having a transverse slot therein and a body supporting element slidably mounted in the sleeve and provided with recesses along its body portion for co-action with a latch member mounted in the transverse slot in the sleeve. By this arrangement the connecting means can be first adjusted so that the latch engages one of the recesses on the body-engaging member to approximately position the element in place. The sleeve is then longitudinally adjusted in order to acquire a final adjustment to thereby move the same to the desired position when the lifting mechanism has been extended so that the body-engaging portion moves into contact with the body of the vehicle. The latch means above noted for connecting the sleeve to the body-engaging member, according to the present invention, is readily releasable, whereby adjustment can be quickly made.

A still further feature of the invention resides in the quick action valve means and its actuating mechanism in which a plurality of resilient means are used to effect the throw of the valve from one position to the other.

Further features and advantages of the invention will be apparent from the specification taken in connection with the drawings, in which:

Figure 1 is a plan view of the device, the top being removed for clearness.

Fig. 2 is a section taken along lines 2—2 of Fig. 1.

Fig. 3 is a section taken along lines 3—3 of Fig. 1 with the right-hand cylinder being energized.

Fig. 4 is a view similar to Fig. 3 with the piston in the right-hand cylinder at the end of its outward stroke and the valve being moved into position to vent this cylinder and charge the left-hand cylinder.

Fig. 5 is a view similar to Fig. 3 with the left-hand cylinder at approximately the limit of its stroke.

Fig. 6 is a detailed view of a portion of the valve-operating mechanism.

Fig. 7 is a view similar to Fig. 6 showing the mechanism in position just prior to the snapping over of the valve.

Fig. 8 is a sectional view taken along lines 8—8 of Fig. 1.

Fig. 9 is an end view of the device with parts of the cover for the valve-actuating mechanism removed.

Fig. 10 is a section taken along lines 10—10 of Fig. 2.

Fig. 11 is a plan view showing the frame member mounted in position on a grease rack.

Fig. 12 shows the device in operation with the automobile shown in one extreme position in full lines and in the other extreme position in dotted lines.

Fig. 13 shows the jack member partly in section to show details of construction.

Fig. 14 is a plan view of the jack structure.

Fig. 15 is a section of the slotted sleeve along lines 15—15 of Fig. 13.

Fig. 16 is a section taken along lines 16—16 of Fig. 13.

According to the present invention a framework is provided which is adapted to be positioned under the vehicle transversely of the same and upon which is mounted the rocking mechanism. The framework consists of a channel member 20 having the sides thereof extending upwardly and a pair of side plates 21 and 22 secured to the upwardly-extending sides of the channel. Positioned to bear against the front side plate 22 is a cover 23 adapted to enclose the valve-actuating mechanism to be later described and also serve as an oil reservoir for the same. The cover has the usual gasket positioned between it and the side plate to seal it and is locked in position by means of a plurality of bolts 24 extending through the frame.

A rocking means is adapted to be mounted on the frame and comprises mechanism for supporting each side of an automobile chassis or body either directly or indirectly through the intermediary of a jack or the like. The mechanism is identical in construction for each side; one side only, therefore, will be described in detail.

A pivot bolt 25 is mounted in the side plates and cover centrally of the frame and extends therethrough as shown in Fig. 10. A spacer sleeve 26 is positioned around the bolt and is clamped against rotation by the side plates. A hinge sleeve 27 surrounds the sleeve 26 to pivot thereon. The hinge has secured thereto a pivoted supporting member 29 adapted to extend along the frame and into supporting relation with the chassis or body of the vehicle to rock the same. The side plates and cover slant outwardly and downwardly from the central pivot bolts so that each supporting member may have free movement about its pivot bolt. The pivoted supporting member is provided with side flanges which extend into overlapped relation with the side plates in all positions of the member. While this is not essential, it is highly desirable as it prevents injury to the attendant should he inadvertently put his hand, for example, between the pivoted member and side plate. It also prevents tools, which are laid indiscriminately about the service rack or greasing pit, from being inserted in the mechanism which will cause the same to jam and break.

The rocking mechanism of the present invention is actuated so that the body-engaging part of the pivoted members is moved alternately up and down. The two members are coordinated and operated in such a manner that one side is up when the other is down. This movement rocks the vehicle from side to side about an axis extending longitudinally of the vehicle. This will cause any rattles or squeaks to become apparent, so that they can be detected and corrected. It also flexes the springs and other parts to be lubricated, while the attendant is applying the lubricant, to facilitate the thorough penetration of the lubricant into tight or "frozen" shackle bolts and spring leaves. Accordingly, the pivoted supporting member has secured on its undersurface adjacent the end opposite the pivot a bracket 30 carrying a roller 31. Mounted for reciprocal movement in the frame in a horizontal plane is a cam 32 having a wedge-like cam face 33 adapted to engage the roller 31 to alternately raise and lower the same. The cam also has a supporting or bearing surface 34 adapted to be supported by a pair of bearing rollers 35 mounted on antifriction bearings in a cradle 36. The cradle 36 is mounted on pivot 37 carried by the blocks 38 secured to the frame so that the roller 31 is positioned on a line extending between these rollers. The cam as shown will always be supported by the two rollers. It will be seen that by this construction the vertical component or load carried by the supporting member is transmitted to and carried by the cam on the bearing rollers.

The cam can be reciprocated by many forms of mechanism, such as for example, an eccentric or cam, screw or fluid-pressure means. According to the present invention, the cam is connected by means of a connecting rod 40 to a piston 41 operating in a horizontally-disposed cylinder 42. One end of the cylinder is threaded into a central bracket 43 secured to the frame. The other end of the cylinder is carried by a supporting bracket 44. As noted above, this structure is duplicated at each end of the device.

With the cylinders and pistons arranged in this manner, they are not subjected to the vertical component of the load and can therefore be operated with low-pressure air to move the cams. A pair of coupling rods 45 and 46 are connected to the cams at each end by the machine so that the two cams will move in unison to raise one side of the body and lower the other.

The central bracket carries a plug valve 50 which controls the operation of the two pistons by alternately supplying energizing fluid or air to one of the cylinders and venting the other to cause them to reciprocate the cams. The valve is connected at one side to a supply of low-pressure air by means of an intake 51 which includes a manually-operated valve 51a (Fig. 12). A stem 52 projects from the plug valve 50 (Fig. 10) and extends through an opening 47 in the coupling bar 46 and through the side wall 22 into the cover 23 and is provided with the usual packing 53. Keyed to the outer end of the stem 52 is an actuating member 54 having an enlarged head 55 provided with a pair of spaced notches 56. A spring-pressed plunger 57 having a V-shaped end 58 is adapted to engage the spaced recesses and hold the valve in one of two positions in which it is energizing one of the cylinders. A snap-action mechanism is provided for quickly moving the valve to either of the positions when the cams and consequently the pivoted members are at the end of their strokes to reverse their action. This may be of any well-known construction. In the present invention, however, a segmental gear 59 is mounted to surround the actuating member 54 and rotate thereon. This gear meshes with a rack 60 carried by a pair of rollers 61. The rack has an outwardly-extending finger 60a which projects rearwardly over the coupling bar 46 (see Fig. 9). The coupling bar 46 has secured on its upper surface a pair of springs 62 mounted in brackets 63. The springs are positioned on the coupling bar in such a manner that, when the cams move in either direction and approach the end of their movements the springs will engage the finger 60a so that the rack will be moved thereby. The rack has on its upper surface a pair of cams 64 having cam faces 64a and 64b adapted to engage with a pair of fixedly pivoted arms 65. The pivoted arms are normally pressed into engagement with the cams by springs 66 and, when the bar has moved the cam to a position that the roller 65a on the arm passes the apex of the cam, the spring will tend to move the rack in one direction or the other depending on the face of the cam engaged at that time.

While this mechanism would shift the rack to actuate the valve, it would require that spring 66 be very strong. To avoid this, an auxiliary means has been provided, according to the present invention, to operate in conjunction with the cams and associated mechanism to shift the rack. This auxiliary means comprises a pair of studs 67, 68 mounted in the framework. The studs carry a pair of meshing segmental gears 69, 70. Gear 69 meshes with the rack 60 and is rotated by the movement of the rack through the engagement of finger 60a by the coupler for the cams. A spring 71 is connected to a stud 72 on the gear 69 and to a stud 73 on the gear 70 and tends to move the gears into such a position that the rack will remain at either end of its stroke. Also mounted on the stud 73 is a connector 74 for a rod 75. The rod slides in a pivoted bearing sleeve 76 and has positioned around its outer end a buffer spring 77 held thereon by an adjusting nut 78.

As shown in Fig. 6, the two springs 71 and 77 are in their normal relation and the valve is retained in one of its positions. Movement of the rack to the left, as shown in Fig. 7, moves the segmental gear 59 in the direction of the arrow and moves the gears 69 and 70 in the direction of the arrows. This moves the studs apart thereby expanding the spring 71 and placing it under tension. As shown in Fig. 7, the mechanism is about to snap the valve into its other position. Further movement of the rack by the finger 60a will cause the roller 65a to engage the cam surface 64a, and, under pull of spring 66, tend to move the rack to the left, and also the studs 72 and 73 will have moved past dead center so that spring 71 will also tend to quickly move the rack. The spring 77 will be compressed by this movement and will act as a buffer to absorb the shock of this rapid movement. The movement of the rack under influence of the springs will rotate gear 59 so as to carry a lug 59a on the segmental gear 59 against one or the other of a pair of shoulders 55a or 55b on the actuating member 55, depending upon the direction of the movement of the rack, to cause the actuating member to be moved against the pressure of the spring-pressed plunger into the other position.

It will be seen, therefore, that an adequate snap-action mechanism is provided for controlling the valve, so that, when the cams for rocking the pivoted elements approach the end of the stroke in one direction or the other, it will cause the rack to move and store up energy in a plurality of springs, which plurality of springs will quickly shift the valve upon being moved past a critical position. As shown in Fig. 2, the mechanism above described is duplicated so that snap-action mechanism includes four springs for moving it, and two springs to relieve the shock. By the specific arrangement of springs disclosed herein the device provides a readily operable reversing mechanism, which minimizes the shock generally present in the snapping over of such a valve.

When it is desired to use the device for a servicing operation, a pair of brackets 80 are secured to the sides of the greasing pit or rack in the manner shown in Fig. 12 by having one end engage the guide wall on the same. The device is positioned on the brackets so as to extend transversely of the vehicle.

The vehicles currently used have their chassis or bodies of different widths. The vehicles also are made with great differences in clearance between the chassis and ground. It is necessary to provide the device with means which can be adjusted to accommodate vehicles of various widths and clearance. According to the present invention, the upper surface of each of the pivoted elements is provided with a pair of serrated racks 83 extending longitudinally therealong. A tooth 84 on a cylinder 85 is adapted to engage the rack to position the cylinder under the chassis of the vehicle and hold the same in adjusted position on the pivoted elements so that it will properly engage the chassis of the vehicle. A plunger or piston 86 is mounted in the cylinder and extends through the head 87. The plunger or piston is provided with a hollow stem 88 into which is positioned a threaded sleeve 89 having at its upper end an enlargement having a transverse slot 90. A pair of latch members to be later described are mounted in the tranverse slot and are adapted to engage the stem 92 of a body-engaging and supporting member 93. The member 93 is channel-shaped as shown in Fig. 13 so that it engages the chassis and prevents the same from slipping during the rocking action. The stem of the body-engaging and supporting member is provided with a plurality of grooves 94 adapted to cooperate with the latch members to hold the body-engaging member in one of a plurality of adjusted positions. It will be seen, therefore, that the latch member may be adjusted into approximately the desired position. A further adjustment is made by rotating the threaded sleeve to secure the final adjustment.

The cylinder of the jack is provided with a handle 95 whereby it may be readily moved about and positioned on the pivoted element 29. The jack is also provided with a connection 96 for an air hose 97 adjacent the base thereof. In the air line there is a valve 98 which may be moved into an energizing position to cause the pistons to move to the top of the cylinders and then into a locking position which will lock the air in the cylinder against leakage and effectively prevent the pistons from moving downwardly. The valve has a third position to which it is moved to vent the cylinder and lower the piston.

It will be seen, therefore, that the device can be readily positioned under the vehicle and can be adapted to chassis having various widths and different clearances between the body and the ground.

The latch mechanism above referred to, by which quick adjustment of the jack is accomplished, comprises a pair of C-shaped members 101, 102. The members are positioned in the slot in inverted, nested relation, as shown in Fig. 15, and each have on their opposed inner legs a recess 103, 104 adapted to engage the grooves 94 in the stem of the body-engaging and supporting member. The latch members are moved into operative position by a pair of springs 105 positioned in recesses in the legs and extending therebetween, as shown in Figs. 13 and 15. By using this type of latch the device can be readily assembled and adjusted by pinching the outer legs together. In so pinching these legs together, the inner legs are moved apart so that the stem can be inserted or adjusted in the threaded sleeve.

If desired the device can be used for the purpose of jacking up wheels for tire repairs, brake adjustment and the like. This is done by locating the member 93 under the axle and manipulating the valve 51a so that the pivoted element 29 under the wheel is held in its uppermost position.

The device, by properly positioning of the parts and manipulating the valve 51a, can be used in connection with any other repair or service work which requires the lifting of the car body.

Variations and modifications may be used within the scope of this invention and portions of the improvements may be used without others.

I claim:

1. In a vehicle rocking device, a frame adapted to be disposed beneath a vehicle; a pair of elements pivoted to the frame so as to extend transversely of the vehicle; means carried by the pivotally mounted elements adapted to engage the vehicle body; cams mounted on the frame and associated with each of the pivoted elements; and means for actuating the cams to rock the elements about their pivots.

2. In a vehicle rocking device, a frame adapted to be disposed beneath a vehicle; a pair of elements transversely-extending of the vehicle pivoted to the frame so that each supports one side of the vehicle; a cam associated with each of the transversely-extending elements and mounted on the frame to slide horizontally thereof; and means for sliding the cams in such a manner as to rock the elements about their pivots so that one pivoted element moves upwardly as the other moves downwardly and vice versa.

3. In a vehicle rocking device; a frame adapted to be transversely disposed beneath a vehicle; a pair of elements transversely-extending of the vehicle pivoted to the frame intermediate the sides of the vehicle so that each supports one side of the same; cam means slidably mounted on the frame to reciprocally move longitudinally thereof and associated with each of the transversely-extending pivoted elements; and a fluid cylinder and piston associated with the cam means to move the same and to rock the elements alternately upwardly and downwardly about their pivots.

4. In a vehicle rocking device, a frame adapted to be disposed beneath the vehicle; a pair of elements transversely-extending of the vehicle pivoted to the frame so that each supports one side of the vehicle; a cam associated with each of the transversely-extending elements and mounted on the frame to slide horizontally thereof; means for connecting the cams for simultaneous movement; means for sliding the cams in such a manner as to rock the elements about their pivots so that one pivoted element moves upwardly as the other moves downwardly and vice versa; and means actuated by the connecting means for the two cams for reversing the means for sliding the cams.

5. In a vehicle rocking device, a frame adapted to be disposed beneath a vehicle; vehicle-supporting means pivotally mounted on the frame for rocking movement engaging both sides of the vehicle body; a cam associated with each end of the vehicle-supporting means and movable in a horizontal plane longitudinally of the frame to cause the vehicle to rock about a longitudinal axis intermediate the ends of the vehicle-supporting means; means connecting the cams for simultaneous movement; and means actuated by the connecting means for reversing the movement of the cams.

6. In a vehicle rocking device, a frame having pivoted thereon supporting members extending transversely of the vehicle to a position beneath the frame of said vehicle; adjustable means associated therewith whereby vehicles of different heights can be supported by said members; and means for lifting the ends of said members about their pivots comprising a horizontally slidable wedge cam under each end of the transversely extending supporting members and alternately movable back and forth to cause the supporting members to rock the vehicle about an axis intermediate the sides thereof.

7. In a device of the type described, a frame adapted to be disposed beneath a vehicle; a pair of vehicle-supporting members pivoted to said frame, said members extending transversely of the vehicle so that each supports one side of said vehicle; a wedge-like cam disposed beneath each of said members and associated with said frame for horizontal movement thereon; anti-friction means carried by said frame adapted to support said cams; a roller follower hung from each pivoted member and adapted to be engaged by the cams; a pair of horizontally disposed cylinders having oppositely extending pistons adapted to move therein, said pistons connected to the cams for concerted movement; and means for alternately actuating said pistons whereby the ends of the vehicle-supporting members are moved about their pivots thereby rocking the vehicle about an axis intermediate the sides thereof.

8. In a device of the type described, the combination of a channel member constituting a frame; a pair of vehicle-supporting members pivotally carried by said frame; means for alternately lifting the ends of said vehicle-supporting members about the pivots thereof, said lifting means comprising fluid-operated motors carried within said frame having horizontally disposed cylinders therein; pistons mounted for movement in said cylinders having oppositely extending rods; wedge-like cams connected to said rods for movement therewith, said cams positioned beneath the vehicle-supporting members and adapted to engage the same; means for actuating said motors; and valve means actuated by the movement of said cams for reversing the operation of said motors whereby said cams are reciprocally moved thereby rocking the vehicle-supporting members about the pivots thereof.

9. In a vehicle rocking device, a frame adapted to be disposed beneath a vehicle; a pair of elements pivoted to the frame so as to extend transversely of the vehicle; adjustable means carried by the pivotally mounted elements and adapted to be adjusted so that vehicles of various heights may be supported by the pair of elements; a wedge-shaped cam associated with each of the transversely extending elements, said cams mounted on the frame to slide horizontally thereof; followers for said cams fixed to the pair of elements, and means for sliding the cams in such a manner whereby one follower is at the high point of its cam as the other follower is at the low point of its cam thereby rocking the elements about their pivots.

10. In a vehicle rocking device, a frame adapted to be transversely disposed beneath a vehicle; a pair of elements transversely-extending of the vehicle pivoted to the frame intermediate the sides of the vehicle so that each supports one side of the vehicle; a cam associated with each of the transversely-extending elements and slidably mounted on the frame to reciprocally move longitudinally thereof; means for sliding the cams to rock the elements about their pivots so that one pivoted element moves upwardly as the other moves downwardly and vice versa, said means including a horizontally-disposed cylinder and piston connected to each cam; and valve means actuated by said cams for charging and venting the cylinders alternately.

11. In a vehicle rocking device, a frame adapted to be disposed beneath a vehicle; a pair of elements transversely-extending of the vehicle pivoted to the frame so that each supports one side of the vehicle; actuating means associated with each of the transversely-extending elements and mounted on the frame to slide longitudinally thereof; means for sliding the actuating means in such a manner to rock the elements about their pivots so that one pivoted element moves upwardly as the other moves downwardly and vice versa, said means including a horizontally disposed cylinder and piston connected to the actuating means; means for charging and venting the cylinders alternately; and means responsive to the movement of the actuating means for actuating the last-named means.

12. In a vehicle rocking device, a frame; a pair of vehicle-supporting members pivotally mounted on the frame; a wedge-shaped cam mounted for horizontal movement on the frame and disposed beneath each of the supporting members for moving the supporting members about their pivots; coupling rods connecting the cams for movement as a unit; fluid-operated means for actuating the cams; a source of fluid supply; a control valve intermediate said source of fluid supply and the fluid-actuating means; means associated with the cams for actuating the valve to reverse the operation of the cams comprising a slidable rack having a finger secured thereto and projecting into the path of movement of the coupling rod to be engaged by a projection thereon; and a plurality of springs normally inactive but energized by movement of the rack to have energy stored therein for moving the rack rapidly after it has passed a predetermined point expending the energy stored therein by the initial movement of the rack.

WILLIS A. SWAN.